INVENTORS
ARTHUR MILLER
GERARD R. PATRICK
DANIEL D. STRASSBERG

United States Patent Office 3,518,558
Patented June 30, 1970

3,518,558
SIGNAL RATE CONVERTER
Arthur Miller, Brookline, Gerard R. Patrick, Winchester, and Daniel D. Strassberg, Arlington, Mass., assignors to Hewlett-Packard Company, Palo Alto, Calif., a corporation of California
Filed June 6, 1968, Ser. No. 734,904
Int. Cl. H03b 3/04
U.S. Cl. 328—140    5 Claims

ABSTRACT OF THE DISCLOSURE

The time interval between successive signal events is converted to a frequency which decreases with time and which generates an analog signal that is sampled upon recurrence of the next signal event to provide an output that is directly proportional to the repetition rate of signal events.

Background of the invention

The repetition rate or frequency of applied signal events is commonly measured over a number of periods of the events being measured. The rate or frequency is then computed from the number of signal events which occurred in the selected interval of time. This technique is useful for signal events which recur periodically at high repetition rates but has limited usefulness when measuring low rates or frequencies because long measurement periods, many times longer than the interval between events, are required to obtain an accurate indication of rate or frequency.

Also, this technique has limited usefulness in applications such as physiological measurements where signal events do not recur continuously over the entire measurement period or where the rate or frequency of signal events varies over the measurement period.

Summary of the invention

Accordingly, the signal rate converter of the present invention responds to the period between signal events and indicates the corresponding rate during a subsequent period between signal events. Short-term variations in rate between signal events are thus not averaged out, and erroneous output indications are avoided when the signal events cease recurring. The period between signal events controls a signal generator which produces an oscillatory signal that decreases in frequency with time. The duty cycle of a chain of narrow pulses which recur at the frequency of the oscillatory signal is detected and sampled at the appropriate instant to produce an output indication of the rate or frequency of applied signal events.

Preferred embodiment of the present invention

Figure 1:
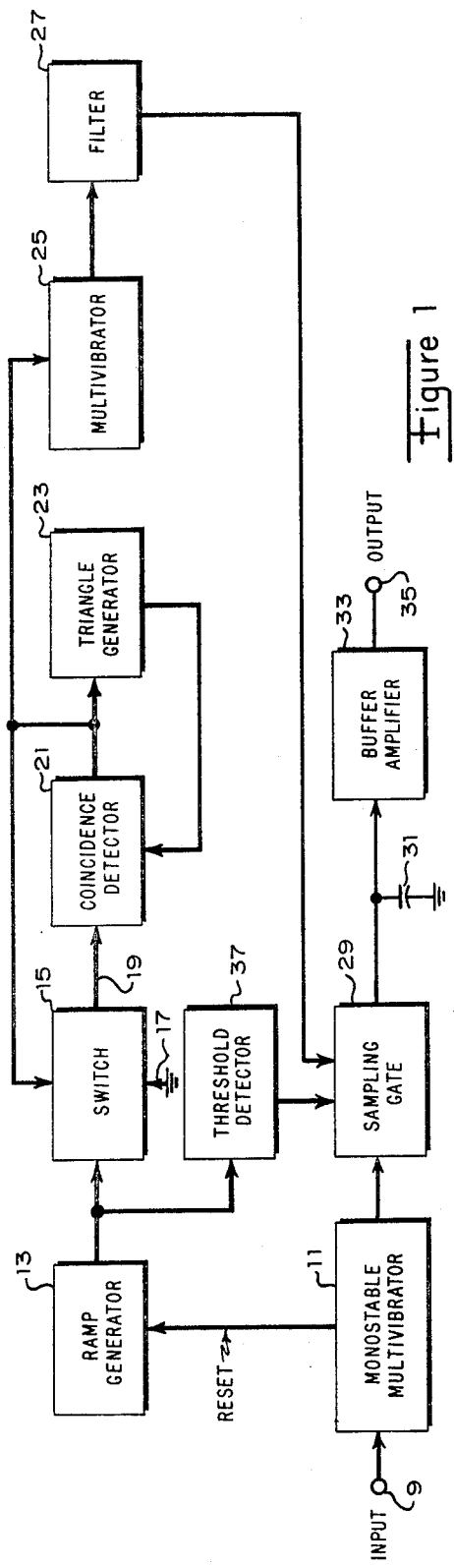
FIG. 1 is a block diagram of the converter circuit of the present invention.
Figure 2:
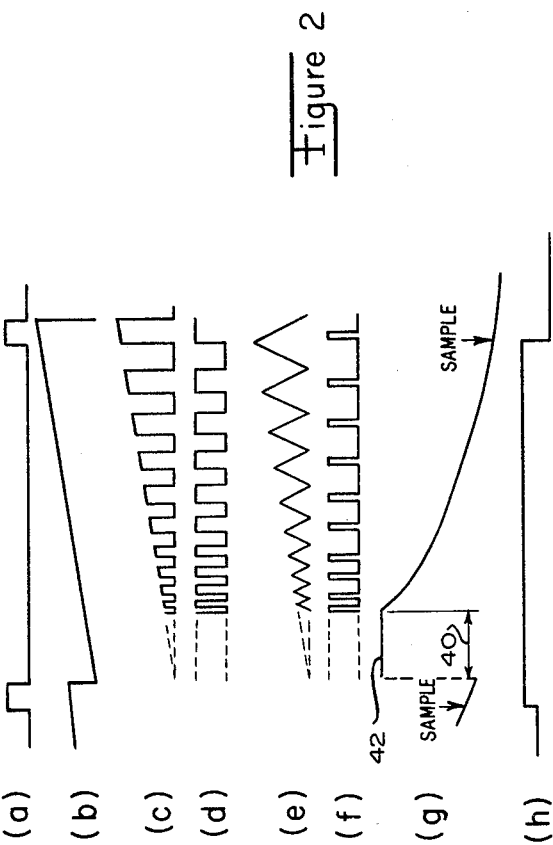
FIG. 2 is a graph showing the operating waveforms of the circuit of FIG. 1.

Referring to the diagram of FIG. 1 and to the graph of FIG. 2, there is shown a monostable multivibrator 11 which is connected to the signal input 9 for receiving applied signal events to be measured. The output of multivibrator 11 (FIG. 2a) is applied to the ramp generator 13 for initiating a long ramp signal (FIG. 2b) each time an applied signal event at input 9 actuates the multivibrator 11. The ramp generator 13 may include a high-gain amplifier and a capacitor connected from the output to the input of the amplifier to form a conventional operational integrator. The slope of the ramp signal may be altered, for example, to provide different operating ranges of rate or frequency simply by changing the value of the integrating capacitor or by changing the value of input current being integrated.

The ramp signal from the ramp generator 13 is applied to the switch 15 which also receives a reference signal, say, ground 17, and alternately supplies to one input 19 of coincidence detector 21 either the ground reference or the long ramp signal, as shown in FIG. 2c. The coincidence detector 21 receives the output signal from the triangle generator 23 for comparison with either the ground reference or the long ramp signal from generator 13. The triangle generator 23 may include an operational integrator which produces bipolar-slope ramp signals with slopes that are much greater than the slope of the fastest ramp produced by ramp generator 13. When the two signals applied to coincidence detector 21 attain a predetermined relationship, say parity, the coincidence detector 21 produces an output signal (FIG. 2d) which triggers the triangle generator 23 to change sign of its slope (i.e. reverses the run-up or run-down of the signal with time) and triggers the switch 15 to apply the other one of the ground reference or slow ramp signals to the input 19 of coincidence detector 21. Thus, as the signal from triangle generator 23 which is applied to the coincidence detector 21 runs up with time, switch 15 applies the ramp signal from generator 13 to input 19 of coincidence detector 21 and when the signal from triangle generator 23 runs down with time, the switch 15 applies the ground reference to input 19 of the coincidence detector 21, thereby producing a waveform as shown in FIG. 2e.

The output signal (FIG. 2d) from coincidence detector 21 also triggers multivibrator 25 which produces a narrow pulse of constant area (FIG. 2f) at each coincidence of the triangle and ramp signals. It should be noted that the frequency or repetition rate of these pulses from multivibrator 25 varies inversely with time since the previous input signal event which reset the ramp generator 13. Thus the high frequency of pulses from multivibrator 25 is directly proportional to the low frequency or low repetition rate of input signal events.

Where an analog output related to the rate of input signal events is desired, the narrow pulses from multivibrator 25 may be filtered in low-pass filter 27 to produce an output (FIG. 2g) which at the time of an input signal event is inversely proportional to the time since the previous input signal event. This filtered output is thus applied to the sampling gate 29. The sampling gate 29 is momentarily rendered conductive each time multivibrator 11 is triggered by an input signal event to produce a sample pulse having an amplitude which is proportional to the output signal from filter 27 at the instant the next input signal event triggers multivibrator 11. The amplitude of the sample pulse is stored on capacitor 31 between input signal events and the stored value is amplified by output amplifier 33 to produce an output on terminal 35 which is proportional to the rate or frequency of the input signal events (as determined by the interval between preceding signal events). This output thus varies in a step-wise fashion, as shown in FIG. 2h, where the rate and hence the interval between input signal events is changing with time.

The triangle generator 23 is designed to produce a maximum amplitude which is less than the long ramp signal (FIG. 2b) after, say one minute, so that coincidence detector 21 cannot produce pulses after a one-minute interval following an input signal event. Since coincidence detector 21 can no longer produce pulses upon comparison of applied signals after the one-minute interval, the multivibrator 25 no longer supplies pulses to the filter 27 and its output therefore drops to zero. Also, a threshold detector 37 is connected to the ramp generator 13 and to the sampling gate 29 for enabling the gate 29 upon the long ramp signal attaining a certain value after the one-minute interval. The threshold detector thus maintains the sampling gate conductive to clamp the voltage across capacitor 31 to zero, the magnitude of the signal from filter 27. This protection circuitry thus limits the low frequency response of the present invention to the reciprocal of the selected time interval (say, one minute for a low-frequency limit of one event per minute).

The upper limit of frequency response is determined primarily by the recovery time of the monostable multivibrator 25. As the rate of recurrence of input signal events increases, a critical rate is attained for which the period of triangle waves from generator 23 produced during each long ramp signal is shorter than the period required for multivibrator 25 to recover from its high output state. Thus, during an initial interval 40 in each long ramp signal, the output of multivibrator 25 remains high so that the output 42 of low pass filter 27 also remains at a high, constant value, independent of the rate of recurrence of input signal events above critical rate. This initial interval 40 is only about 1.4% of the longest measurable period, thus providing a convenient upper limit of about 2000 events per minute and a dynamic range of measurable rates of about 70 to 1 on any operating range.

We claim:

1. A signal converter circuit responsive to the time interval between signal events, the circuit comprising:
means responsive to an applied signal event to produce a first signal having an amplitude that varies with time;
circuit means responsive to said first signal for producing a plurality of second signals having substantially constant area and having a repetition rate which decreases with time;
means responsive to said second signals for producing an analog signal which decreases in amplitude with time;
sampling means responsive to a successive applied signal event to sample said analog signal for producing during a selected interval following said successive applied signal event an output which is related to the sampled amplitude of the analog signal.

2. A circuit as in claim 1 comprising: a threshold detector connected to receive said first signal and responsive to said signal attaining a predetermined value for terminating said output.

3. A circuit as in claim 1 wherein said circuit means includes a bipolar-slope ramp generator;
detector means having an output, an input connected to the bipolar-slope ramp generator and having another input;
a source of reference potential;
switching means connected to receive said reference potential and said first signal for applying a selected one thereof to said other input of the detector means for comparison with the signal from said bipolar-slope ramp generator; and
means coupling the output of said detector means to said ramp generator and to said switching means for altering the polarity of the slope of the ramp generated by said bipolar-slope ramp generator and for altering the selected one of said first signal and said refeernce potential that is applied to said other input of the detector means in response to the signals applied to said detector means attaining a predetermined relationship.

4. A signalling circuit comprising:
means responsive to an applied signal event to produce a first signal having an amplitude that varies with time;
a generator for producing ramp signals of bipolar slope; detector means having an output, an input connected to the bipolar-slope ramp generator and having another input;
a source of reference potential;
switching means connected to receive said reference potential and said first signal for applying a selected one thereof to said other input of the detector means for comparison with the signal from said bipolar-slope ramp generator; and
means coupling the output of said detector means to said ramp generator and to said switching means for altering the polarity of the slope of the ramp generated by said bipolar-slope ramp generator and for altering the selected one of said first signal and said reference potential that is applied to said other input of the detector means in response to the signals applied to said detector means attaining a predetermined relationship; and
circuit means coupled to said detector means for producing an output pulse in response to the output of said detector means for providing a burst of a number of output pulses proportional to the rate of input signal events.

5. A signalling circuit comprising:
a generator for producing ramp signals of bipolar-slope; detector means having an output connected to receive ramp signals from said generator and having another input;
a source of reference potential;
switching means connected to receive said reference potential and an applied signal for applying a selected one thereof to said other input of the detector means for comparison with the signal from said bipolar-slope ramp generator;
means coupling the output of said detector means to said ramp generator and to said switching means for altering the polarity of the slope of the ramp generated by said bipolar-slope ramp generator and for altering the selected one of said applied signal and said reference potential that is applied to said other input to the detector means in response to the signals applied to said detector means attaining a predetermined relationship;
circuit means coupled to said detector means for producing output pulses of selected area in response to the output of said detector means; and
filter means coupled to the output of said circuit means for producing an analog output related to the output pulses of selected area from said circuit means.

References Cited

UNITED STATES PATENTS 3,284,800  11/1966  Nilssen _____ 307—228 XR

STANLEY T. KRAWCZEWICZ, Primary Examiner

U.S. Cl. X.R.

307—228, 261, 271; 328—36

UNITED STATES PATENT OFFICE
CERTIFICATE OF CORRECTION

Patent No. 3,518,558      Dated June 30, 1970

Inventor(s) A. Miller et al

It is certified that error appears in the above-identified patent and that said Letters Patent are hereby corrected as shown below:

Column 3, line 64, "refeernce" should read -- reference --;

Column 4, line 33, after "output" insert -- , an input --.

SIGNED AND
SEALED

SEP 29 1970

(SEAL)
Attest:

Edward M. Fletcher, Jr.
Attesting Officer

WILLIAM E. SCHUYLER, JR.
Commissioner of Patents